(No Model.)
H. C. STONE.
CLUTCH DEVICE FOR HARVESTERS.
No. 522,628. Patented July 10, 1894.
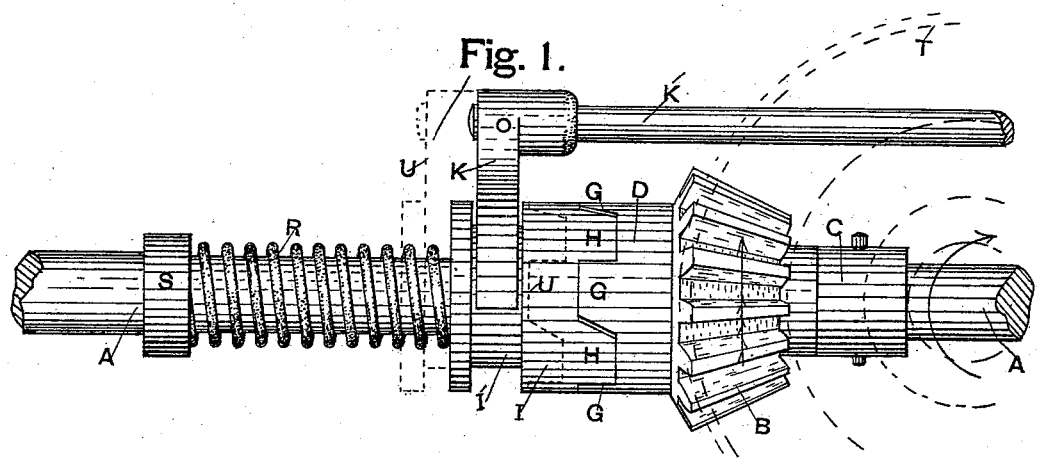
Fig. 1.
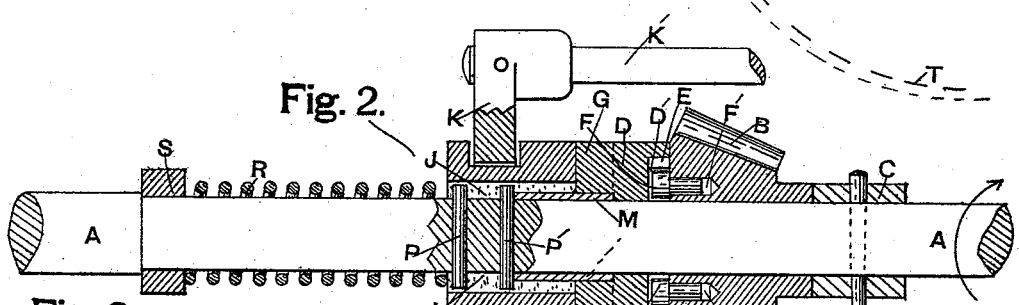
Fig. 2.
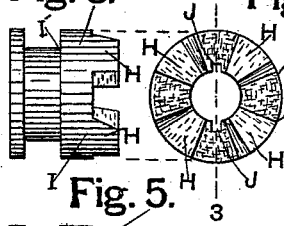
Fig. 3.
Fig. 5.
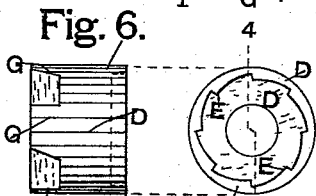
Fig. 4.
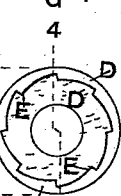
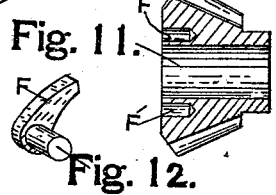
Fig. 6.
Fig. 7.
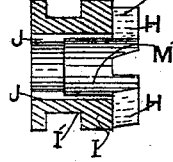
Fig. 8.
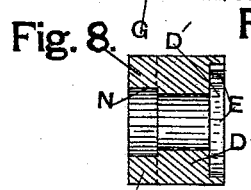
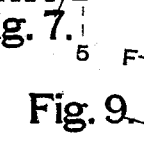
Fig. 9.
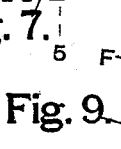
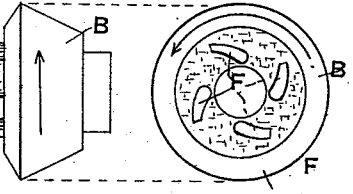
Fig. 11.
Fig. 12.
Fig. 10.
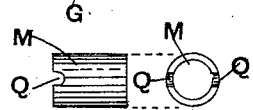
Fig. 13.
WITNESSES:
James Milne.
H. L. Brown.
INVENTOR:
Henry C. Stone
By his atty Oscar Snell

UNITED STATES PATENT OFFICE.

HENRY C. STONE, OF SOUTH EVANSTON, ILLINOIS, ASSIGNOR TO OLIVE A. STONE, OF SAME PLACE.

CLUTCH DEVICE FOR HARVESTERS.

SPECIFICATION forming part of Letters Patent No. 522,628, dated July 10, 1894.

Application filed January 23, 1893. Renewed December 22, 1893. Serial No. 494,476. (No model.)

*To all whom it may concern:*

Be it known that I, HENRY C. STONE, a citizen of the United States, residing at South Evanston, in the county of Cook and State of Illinois, have invented a new and useful Clutch Device for Harvesters, of which the following is a specification.

My invention relates to clutches, but more especially to a particular form of clutch which is specially adapted to operate in combination with my frictional clutch for harvesters to which a fly wheel is connected, which frictional clutch was patented by me in the United States of America November 24, 1891, and numbered 463,752.

In most ordinary harvesters there is a clutch mechanism for disconnecting the crank shaft, which drives the sickle, from the other mechanism, so that the machine can be driven along without operating the sickle as is well known. In the application of my fly wheel, and the frictional clutch mechanism embodied in the patent above referred to, the fly wheel is for the purpose of equalizing the speed of the several driven parts of the machine, but in practice, when the driving part of the harvester is slowed down from any reason, the tendency of the fly wheel is to carry the sickle crank shaft at a speed greater than the speed of the mechanism which drives it, which causes the clutch mechanism which connects the crank shaft to its driver to slip backward.

In many ordinary forms of clutch mechanism for connecting the crank shaft of a harvester to its driver, a simple form of clutch is used in which are lugs or teeth in each opposing member, which are held in engagement with a spring, and are thrown out of engagement by means of a lever. In clutches of the common construction the teeth are usually beveled at the back side so that, should the driven shaft revolve faster than the driver the clutch will slip, and the jumping of the teeth of the clutch over each other, backward against the pressure of the spring which holds them in contact, causes a very disagreeable noise and jar, and is destructive to the parts of the clutch. Now, to obviate these objections and to provide a form of clutch to connect the crank shaft of a harvester with the driving mechanism thereof, which will permit the crank shaft to revolve faster than the shaft which drives it, and at the same time obviate all disagreeable noise and jar when there is a difference in speed between the two shafts, as above described, are what I have attained in the mechanism hereinafter described, and which is illustrated in the accompanying drawings, in which—

Figure 1 is a side elevation of a portion of the length of the crank shaft of an ordinary harvester with my new clutch mechanism attached thereto, the circular dotted lines at the right hand side of the figure indicating the position of the bevel wheel which drives the pinion shown. Fig. 2 is an elevation of a portion of the crank shaft with the central portion thereof broken away, to show position of two pins which will be described, the several parts of the clutch and the pinion being shown in vertical section in the relative position they have when the clutch is closed. Fig. 3 is a side elevation of the sliding clutch sleeve, and Fig. 4 is an elevation of the right hand end of Fig. 3. Fig. 5 is a vertical section of Fig. 4 on line 2—3. Fig. 6 is a side elevation of the ratchet collar, and Fig. 7 is an elevation of the right hand end of Fig. 6, showing ratchet teeth around the periphery of a circular depression in the end of the collar. Fig. 8 is a vertical section of Fig. 7, on line 4—5. Fig. 9 is a side elevation of the crank shaft pinion, the cogs not shown, and Fig. 10 is an elevation of the left hand end of Fig. 9. Figs. 9 and 10 are shown to give relative positions of the pawls which operate in the end of collar Fig. 7. Fig. 11 is a vertical section of the crank shaft pinion, similar to what is shown in Fig. 2. Fig. 12 is one of the springless centrifugal pawls which are shown in position in Fig. 10. Fig. 13 is a side and end elevation of a sleeve for retaining the ratchet collar, Figs. 6, 7 and 8, in position, as will be described.

Similar letters indicate like parts throughout the several views.

A is the crank shaft for driving the sickle of an ordinary harvester, and B a bevel pinion mounted on this shaft to turn in one direction, the pinion being held from turning in the opposite direction by pawls, as hereinafter described. At C is a collar for retaining the pinion from sliding in one direction on the shaft.

At D is mounted a ratchet collar whose end next to the base of pinion B is provided with a circular depression D' having peripheral ratchet teeth, E, and at the end of the pinion are pawls F whose pivotal projections are mounted in holes F' in the end of the pinion, so that, when the pinion B and the collar D are in the position shown in Figs. 1 and 2, the pawls F have a position within depression D', as shown in Fig. 2, the length of the pawls disposed relative to the pinion as is shown in Fig. 10, it being understood that pinion B turns in the direction of the arrow, and operates to drive the clutch collar D.

At the left hand end of clutch collar D, Fig. 6 are shown clutch teeth G, which are adapted to engage the clutch teeth H, at one end of a sliding collar I, which collar I has two grooves J, cut inside the bore thereof, and when it is mounted on shaft A the ends of two pins, P and P', which pass through shaft A, have a position within these grooves, and serve as stops to prevent the collar I from turning on shaft A, but permit the collar to have a longitudinal movement to and from collar D; collar I being operated to move longitudinally on shaft A by means of the shifter fork K, which engages the collar in the groove I', the fork being moved by means of its rod K' in any usual manner.

At S is a collar secured to shaft A, and between collar S and sliding collar I is a spring R, which serves to hold collar I in engagement with collar D.

Collar D is held in contact with pinion B by means of a sleeve M, which has position in a counter bore M', within collar I, and counter bore N in collar D. Sleeve M is held from turning on shaft A, and from longitudinal movement from collar D by means of pin P' whose ends engage in notches Q at the end of the sleeve.

In Fig. 1 the circular dotted lines T indicate the position of a bevel wheel, in one kind of harvester, which is geared to and drives pinion B.

In my invention, which is the subject of Letters Patent of the United States No. 463,752, hereinbefore referred to, the fly wheel is connected to the sickle crank shaft, which is represented by A in the drawings herewith, and when a harvester provided with this fly wheel and clutch mechanism is started in motion the crank shaft A first imparts to the fly wheel a high rate of speed, after which, should the harvester slow down from any cause, below the normal rate of motion, then the fly wheel would become the driver of the sickle crank shaft, the forward motion of the crank shaft being faster than its pinion B, which is permitted in my new clutch mechanism herein described, for it will be noticed that, the springless pawls F are so disposed relative to the ratchet teeth E of ratchet collar D that pinion B can drive shaft A in only one direction, the shaft A being capable of a forward motion faster than pinion B by ratchet collar D being carried around by shaft A opposite to the direction to engage the pawls F in the notches thereof, and since the pawls have no spring to hold them in operative position, but are thrown out by centrifugal action, the operation of the mechanism is practically noiseless, and without the destructive jars incident to the use of ordinary clutch mechanism in connection with a fly wheel for equalizing the speed of the operative parts of a harvester.

It is obvious that, by moving sliding clutch collar I out to the position shown in the dotted lines U, Fig. 1, that clutch teeth G and H would be disengaged so that pinion B and collar D would freely revolve around shaft A, thus disconnecting the shaft from its pinion.

I claim as my invention—

1. In combnation, a shaft, a pinion and two collars mounted thereon, the pinion and one of the collars being loosely mounted on the shaft and the other collar being secured to the shaft in such manner as to rotate therewith, and adapted to be connected with or disengaged from the loose collar, and means between the loose collar and the pinion for causing them to move at a uniform or at a different rate of speed in one direction, or permitting one of them to move in the opposite direction, substantially as set forth.

2. In a harvester, the combination, with a sickle crank shaft adapted to be provided with a fly wheel, of a pinion and two collars mounted on said shaft, the pinion and one of the collars being loosely mounted upon the shaft and means for locking them together when moving in one direction the collars being provided at their adjacent ends with teeth, whereby the pinion may impart motion to the collars and the shaft in but one direction, and the shaft may rotate at a greater rate of speed than the pinion, substantially as set forth.

3. In a harvester, the combination, with a sickle crank shaft adapted to be provided with a fly wheel, of a pinion and two collars mounted upon said shaft, the pinion and one of the collars being loosely mounted upon the shaft and the other collar being secured to the shaft to rotate therewith but free to be moved longitudinally upon the shaft, the adjacent ends of said collars being provided with teeth which are adapted to be thrown into or out of engagement with each other, and gravity pawls between the loosely mounted collar and the pinion, whereby the rotation of the pinion in one direction will rotate the shaft but the shaft may rotate independently of the pinion, substantially as set forth.

4. In a harvester, the combination with a shaft, of a pinion and a collar loosely mounted thereon, pawl and ratchet mechanism between the pinion and the collar, a stop upon the shaft, a sleeve upon the shaft between the collar and the stop, and a second collar upon the shaft and the sleeve, the interior of which is provided with a groove for the stop, the adjacent ends of the collars being adapted to be connected with or disengaged from each other, substantially as set forth.

5. In a harvester, the combination with a shaft, of a pinion and a collar loosely mounted thereon, each end of the collar being provided with an annular recess, one of which is of greater diameter than the other one and provided with interior ratchet teeth and the opposite end provided with clutch teeth, pawls pivotally secured in the end of the pinion adjacent to the collar and adapted to engage with the ratchet teeth of said collar, a stop upon the shaft, a sleeve upon the shaft, one end of which rests within the smaller recess of the collar, and the other end engages with the stop of the shaft, and prevents longitudinal movement of the pinion and the collar, and a collar upon the shaft and the sleeve, one end of which is provided with clutch teeth to engage with the clutch teeth of the other collar, and the interior of which is grooved for the stops upon the shaft, substantially as set forth.

In testimony that I claim the foregoing I have hereunto set my hand, this 9th day of January, 1893, in the presence of witnesses.

HENRY C. STONE.

Witnesses:
OSCAR SNELL,
A. ERNEST KNIGHT.